3,011,865
Patented Dec. 5, 1961

3,011,865
SEPARATION OF URANIUM AND
PLUTONIUM OXIDES
Glen E. Benedict, Richland, Wash., and Ward L. Lyon, Fremont, Calif., assignors to the United States of America as represented by the United States Atomic Energy Commission
No Drawing. Filed Aug. 22, 1960, Ser. No. 51,241
5 Claims. (Cl. 23—14.5)

This invention is directed to a method of separating a portion of the uranium from a first mixture of uranium and plutonium dioxides and recovering the plutonium and the remainder of the uranium as a second mixture of the dioxides, which will thus contain a higher proportion of plutonium than the original mixture.

This process is an improvement on that disclosed in an application by Ward L. Lyon entitled "Uranium Separation Process," filed June 20, 1960, Serial No. 39,418. The term "salt cycle process" has been applied as a generic term to the process of the Lyon application and the invention herein described. The present invention is particularly applicable in connection with what is known as "plutonium recycle."

Reactors which use natural or slightly enriched uranium fuel produce plutonium, some of which is fissioned in place, and some of which remains in the fuel elements when they are finally removed from the spent fuel elements and put back in the reactor with a fresh fuel charge, an operation called "recycling."

Power reactors can be designed to operate with natural uranium, but there are advantages in enriching it. Enrichment can extend the useful life of a fuel loading by increasing its initial reactivity; thus it can increase the amount of energy produced from the fuel. When the recycled plutonium is fissioned, it increases the production of new plutonium in the reactor, and leads to further fissions and further buildup of plutonium for the next recycle operation. Plutonium recycling can thus provide a limited amount of fuel enrichment for power reactors in a self-sustaining operation with natural or depleted uranium feed, independent of uranium isotope separation.

Detailed discussion of plutonium recycle is contained in published Reports HW–50700, HW–52000, HW–58000, HW–62000, and in Dietrich and Zinn, "Solid Fuel Reactors" (1958).

Fuels formed of uranium dioxide or mixed uranium and plutonium dioxides are highly desirable for use in power reactors. In order to keep the reactivity of recycled $UO_2$ reactor fuels at an acceptable level, the plutonium in the spent fuel must be concentrated relative to uranium prior to recycle.

The process herein described, like that of the Lyon application, involves the chlorination and dissolution of the oxide fuel or other $UO_2$—$PuO_2$ mixtures in an anhydrous molten salt bath such as the molten sodium chloride-potassium chloride bath and a separation of uranium and plutonium oxides from that bath. (Hence the name "salt cycle process.") In the method of the Lyon application the chlorination is carried out under conditions such that only, or substantially only, the uranium is dissolved. The plutonium is then separated by filtration or decantation. The uranium is recovered by reduction.

In the present process, on the other hand, both the uranium and the plutonium are dissolved, and a portion of the uranium is separated (by various means which will be described) from the plutonium and the remainder of the uranium. The remaining uranium and the plutonium are then reduced, preferably electrolytically, to $UO_2$ and apparently $PuO_2$, which are co-precipitated.

This procedure has several advantages. The relatively small volume of plutonium oxide is entrained by the larger volume of uranium oxide. The oxides are recovered in the form of an adherent deposit on the electrodes, and are removed from the bath by simply withdrawing the electrodes. The process can be controlled to give a mixture of the oxides in correct proportions for direct refabrication into fuel elements. The co-precipitation gives an intimate mixture which is desirable as a fuel.

In common with the process of the Lyon application, the present process can be carried out on relatively small batches, with simple equipment, and is thus suitable for use directly at the sites of power reactors.

The preferred embodiment of our invention comprises:

(1) Dissolving the uranium and plutonium oxides in a molten anhydrous bath of e.g., sodium and potassium chlorides, while passing anhydrous chlorine and hydrogen chloride through the bath, preferably in the presence of carbon.

(2) Electrolytically reducing, under oxygen free conditions, a portion of the uranium chlorides thus formed, thereby depositing $UO_2$ on the cathode, while leaving the plutonium and the remaining uranium in solution, then withdrawing the cathode with its deposit of uranium dioxide.

(3) Sparging the bath with air, inserting fresh electrodes, and again electrolyzing the melt, this time while passing air over the bath. Under these conditions, uranium dioxide and a plutonium compound believed to be plutonium dioxide are codeposited on the cathode. The mixed oxides, which are enriched in plutonium as compared to the starting material, are recovered by withdrawing the cathode from the salt bath and removing the deposit.

Referring now to steps 1 and 2 in more detail, it will be noted that an anhydrous mixture of $Cl_2$ and HCl is employed in the dissolution step.

These reagents dehydrate the melt and more completely dissolve the plutonium. Carbon may also be added to help dehydrate and deoxygenate the melt. Carbon and $Cl_2$ also reduce some of the $UO_2Cl_2$ to $UCl_4$ which apparently aids in plutonium dissolution. Dissolution is facilitated if the oxides are first roasted in air.

After this dissolution procedure is complete, electrodes, preferably graphite, are inserted into the melt (electrode drying is carried out by a 10-minute anhydrous HCl sparge prior to electrolysis), and a portion of the uranyl chloride is reduced to $UO_2$ on the cathode under anaerobic conditions by D.C. current electrolysis. This $UO_2$ is essentially free of plutonium. As much as forty percent of the uranium has been removed from the melt with only 0.3 percent of the plutonium being carried.

Certain modifications of step 1 are possible. When the plutonium is present in very small proportions, e.g., 1 part Pu to 300 parts U, and particularly when the plutonium has been formed in situ by irradiation of uranium, it is possible to omit the hydrogen chloride and secure chlorination by the use of chlorine or phosgene. However, to insure that complete dissolution is obtained, we prefer to employ the HCl—$Cl_2$ mixture.

In step 2, a different method of reduction may be employed. A portion of the uranyl chloride formed is precipitated as $UO_2$ by addition of anhydrous ammonia gas. (Hydrogen gas or other compounds producing hydrogen could also be used.) This operation leaves the plutonium chloride and the remaining uranyl chloride in solution in the molten salt, thus an increase in Pu/U ratio is achieved. Difficulty has been encountered in carrying out this process due to the problem of keeping ammonia gas anhydrous. Water and air react with the soluble plutonium III chloride species to form a plutonium species which is carried by the $UO_2$ precipitate. However, under proper anhydrous and oxygen free conditions this separation process is feasible. Separation requires a decantation or filtration of the plutonium rich salt phase prior to the electrolysis step described in 3 above.

The electrolytic method of carrying out the reduction of step 2 is preferred for several reasons. They are: (a) The uranium is removed as $UO_2$ on the cathode and hence is easier to discard. (b) The amount removed is proportional to a D.C. current flow which is much easier to control than is the $NH_3$ reduction. (c) The plutonium losses experimentally demonstrated are sufficiently low for most reprocessing jobs.

The electrolytic method of carrying out the coprecipitation in step 3 is also preferred for the same reasons as given above for step 2. However, any well known chemical reduction in place of the electrolytic step can be used. One such procedure is to sparge the bath with oxygen to convert the plutonium to a form in which it is carried by the $UO_2$, then percipitating $UO_2$ and the plutonium by adding $NH_3$, and separating the precipitate from the molten salt.

The entire preferred embodiment can be carried out in a single electrolytic cell provided with heating means and means for sparging with gas.

Example I

This example illustrates the preferred embodiment described above. Ten grams of $UO_2$ was mixed with 0.175 gram of a five to one ratio of mixed crystal $UO_2$—$PuO_2$ and the oxides were roasted in air for fifteen minutes at 550° C. to convert $UO_2$ to $U_3O_8$. Seventy-five grams of equal molar mixture of KCl—NaCl was added and the furnace temperature was increased to 800° C. (~760° C. melt temperature).

An equal volume mixture of anhydrous HCl and $Cl_2$ was sparged through the melt for two hours. (The HCl and $Cl_2$ were dried by passing the gas through concentrated $H_2SO_4$.)

One-tenth gram of carbon was added after the first hour of dissolution. After dissolution was complete, graphite electrodes were inserted into the melt and a direct current was passed for 30 minutes. (In this particular case it was 1.25 amps. at one volt.)

The resulting electrode deposit contained 27 percent of the uranium and 0.25 percent of the plutonium charged. The melt was then sparged with air for 35 minutes before a fresh pair of electrodes were inserted and a second electrolysis was started. An air sweep was blown over the surface of the melt during this electrolysis. Five-tenths of an ampere current was passed for one hour and ten minutes. The second electrode deposit contained 34 percent of the uranium and 48.6 percent of the plutonium for an overall plutonium enrichment factor of 1.43.

A second embodiment of our invention carries out the separation of the excess uranium in a somewhat different manner than described in steps 1 and 2 above. The mixed uranium and plutonium oxides are dissolved in the salt bath with chlorination being carried out by either $Cl_2$, $Cl_2$ plus HCl, or phosgene. Complete dissolution of plutonium is not necessary at this stage. By sparging with air, the plutonium is converted to a form which may be carried by $UO_2$. Ammonia gas, or other suitable reducing agent is added to precipitate a fraction of the uranyl chloride as $UO_2$ which carries most of the plutonium. After sufficient settling time has elapsed, a fraction of the uranium-bearing salt phase is decanted.

The $UO_2$—$PuO_2$ precipitate is then dissolved by again introducing chlorine, preferably mixed with HCl. Electrolytic co-precipitation is then carried out as before (step 3, above).

Example II

This example illustrates the portion of this second embodiment which differs from that of the preferred modification.

Seven and four-tenths grams of $U_3O_8$ and one gram of a five to one ratio of $UO_2$—$PuO_2$ mixed crystal oxide were added to sixty-six grams of an equi-molar mixture of KCl—NaCl. The salt was melted (~760° C. melt temperature) and chlorine gas was sparged through the melt for two hours. Then air was blown through the melt for one hour, and a three-minute ammonia gas sparge was added to reduce a small percentage (~1 percent) of the uranium to $UO_2$ which carries the plutonium thus oxidized.

Before sampling, a thirty minute settling time was allowed. The plutonium content of the melt was $4.6 \times 10^4$ disintegrations per minute per milligram of potassium. The ratio of plutonium to potassium added was $1.2 \times 10^6$ d./m./mg.K. Decanting 25 percent of the salt phase would carry about 1 to 2 percent of the plutonium with slightly less than 25 percent of the uranium.

While we have shown in our specific examples the use of a $UO_2$—$PuO_2$ mixture without fission products the process of these examples will also give satisfactory and useful results with nuclear fuel elements containing $UO_2$—$PuO_2$ mixtures with fission products. The final product is a $UO_2$—$PuO_2$ mixture enriched in plutonium with a reduced concentration of fission products. When the nuclear fuel element is processed, there is a retention of fission products in the salt bath, so that the salt bath must be discarded when the buildup of fission products becomes too great.

While we have shown in our specific examples the use of an equimolar mixture of NaCl and KCl, these proportions are not critical and may range from about 30 to 70 mole percent NaCl. The proportion of oxide to salt may range up to about 1:8, about 1:10 being preferred. The concentration of oxide in the bath must be sufficient to give reasonable conductivity. This will vary with the apparatus, the minimum being about 1/100.

In addition to mixtures of sodium and potassium chlorides, other mixtures of alkali metal chlorides and magnesium chloride may be used, e.g. potassium chloride and lithium chloride, and the ternary sodium, potassium and magnesium chloride mixture. It is important that the mixture be anhydrous and it is desirable that the melting point be as low as possible.

It will be understood that this invention is not to be limited to the details given herein but that it may be modified within the scope of the appended claims.

What is claimed is:

1. A method of treating a first mixture of uranium and plutonium oxides to obtain a second mixture of said oxides containing a higher proportion of plutonium than said first mixture, said method comprising dissolving said first mixture in an anhydrous fused salt bath selected from the class consisting of alkali metal chlorides, magnesium chlorides and mixtures thereof while passing through said bath a chlorinating agent, separating a portion of the uranium from the plutonium and the balance of the uranium in said bath, sparging said bath with air, and co-precipitating said plutonium and said balance of uranium as their dioxides by reducing said plutonium and said balance of uranium while passing oxygen over said bath.

2. A method as defined in claim 1 wherein the chlorinating agent is selected from the group consisting of chlorine, phosgene, and anhydrous mixtures of chlorine and hydrogen chloride and the co-precipitating and reduction is carried out electrolytically.

3. A method as defined in claim 2 wherein said portion of uranium is separated by subjecting said bath to electrolytic reduction under oxygen-free conditions.

4. A method as defined in claim 2, wherein said portion of uranium is separated by treating said bath with a reducing gas under oxygen-free conditions to precipitate said portion of said uranium.

5. A method as defined in claim 2, wherein said portion of uranium is separated by sparging said bath with air, treating said bath with a reducing gas to precipitate said plutonium and said balance of uranium as their dioxides, decanting said bath to remove said portion of said uranium in dissolved form, and again dissolving said precipitated dioxides by passing through said bath an anhydrous mixture of chlorine and hydrogen chloride.

References Cited in the file of this patent

UNITED STATES PATENTS

| | | |
|---|---|---|
| 2,739,111 | Noland et al. | Mar. 20, 1956 |
| 2,893,928 | Kolodney | July 7, 1959 |
| 2,948,586 | Moore | Aug. 9, 1960 |

OTHER REFERENCES

Herrington et al.: "Uranium Production Technology," 1959, pp. 509, 510.

Lyon et al.: HW 62431, October 20, 1959, pp. 2–10, 14–16.